(12) United States Patent
Wichelhaus

(10) Patent No.: US 8,434,635 B2
(45) Date of Patent: May 7, 2013

(54) RE-CLOSABLE CAN END LID WITH A ROTATABLE OPENING AND RE-SEALING TAB AND DRINK CAN EQUIPPED WITH THE RE-SEALABLE CAN END LID

(75) Inventor: André Wichelhaus, Stuttgart (DE)

(73) Assignee: IMV Innovation Marketing und Vertriebs GmbH, Tuebingen, DE (US)

( * ) Notice: Subject to any disclaimer, the term of this patent is extended or adjusted under 35 U.S.C. 154(b) by 0 days.

(21) Appl. No.: 13/002,642

(22) PCT Filed: Sep. 11, 2008

(86) PCT No.: PCT/EP2008/062075
§ 371 (c)(1),
(2), (4) Date: Mar. 24, 2011

(87) PCT Pub. No.: WO2010/000340
PCT Pub. Date: Jan. 7, 2010

(65) Prior Publication Data
US 2011/0163096 A1    Jul. 7, 2011

(30) Foreign Application Priority Data
Jul. 4, 2008  (DE) .......................... 10 2008 031 667

(51) Int. Cl.
*B65D 17/34*   (2006.01)
*B23P 11/00*   (2006.01)

(52) U.S. Cl.
USPC ........................................ 220/270; 29/525.01

(58) Field of Classification Search  . B65D 17/34,17/28, B65D 51/18
See application file for complete search history.

(56) References Cited

U.S. PATENT DOCUMENTS 2,120,186 A * 6/1938 Punte .............................. 220/274
3,223,277 A * 12/1965 Zundel .......................... 220/270
(Continued)

FOREIGN PATENT DOCUMENTS

| FR | 2826940 | 1/2003 |
| JP | 11-91779 | 4/1999 |
| JP | 2004-1782 | 1/2004 |
| WO | 2006009483 | 1/2006 |

OTHER PUBLICATIONS

International Search Report for PCT/EP2008/062075 dated Aug. 7, 2009.

(Continued)

*Primary Examiner* — Robert J Hicks
(74) *Attorney, Agent, or Firm* — Schlee IP International, P.C.; Alexander R. Schlee

(57) ABSTRACT

Re-closable can end lid with a rotatable opening and re-sealing tab, and drink can equipped with the re-sealable can end lid, wherein a lid plate (2) includes a break-away portion (8) surrounded by a predetermined break-line (9) that is separable from the lid plate by the press portion (21) of an opening tab (20) in an opening position of the tab, so that an aperture (10) is created in the lid plate that is surrounded by a ring-wall (11) on the outside of the predetermined break-line (9). On a grip portion (22) of the opening tab (20), a sealing attachment (25) is formed that, after rotating the opening tab (20) into a closing rotating position, fits into a recess surrounded by the ring-wall and sealingly engages on the inner face of the ring-wall (11) along its outer circumferential sealing rim.

40 Claims, 8 Drawing Sheets

U.S. PATENT DOCUMENTS

| | | | | |
|---|---|---|---|---|
| 3,325,043 | A | * | 6/1967 | Catalano et al. ............... 220/270 |
| 3,625,392 | A | * | 12/1971 | Kaminski ..................... 220/270 |
| 3,820,681 | A | | 6/1974 | Hulse |
| 4,018,178 | A | | 4/1977 | Klein et al. |
| 4,433,792 | A | * | 2/1984 | Mandel ........................ 220/269 |
| 4,442,950 | A | | 4/1984 | Wilson |
| 4,463,866 | A | * | 8/1984 | Mandel ........................ 220/269 |
| 4,865,215 | A | | 9/1989 | Wells |
| 4,877,129 | A | * | 10/1989 | Wells ........................... 220/269 |
| 5,129,773 | A | | 7/1992 | Shock |
| 6,059,137 | A | | 5/2000 | Westwood et al. |
| 7,500,577 | B2 | * | 3/2009 | Wichelhaus ............... 220/254.4 |
| 2007/0062946 | A1 | | 3/2007 | Huffman et al. |

OTHER PUBLICATIONS

International Preliminary Report on Patentability for PCT/EP2008/062075 dated Oct. 8, 2010.
Written Opinion of the International Searching Authority for PCT/EP2008/062075 dated Aug. 7, 2009.

* cited by examiner

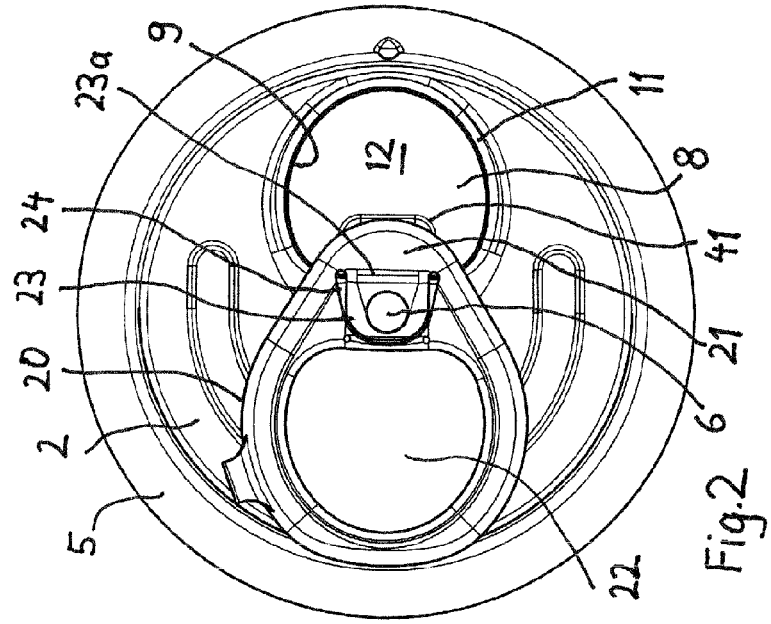
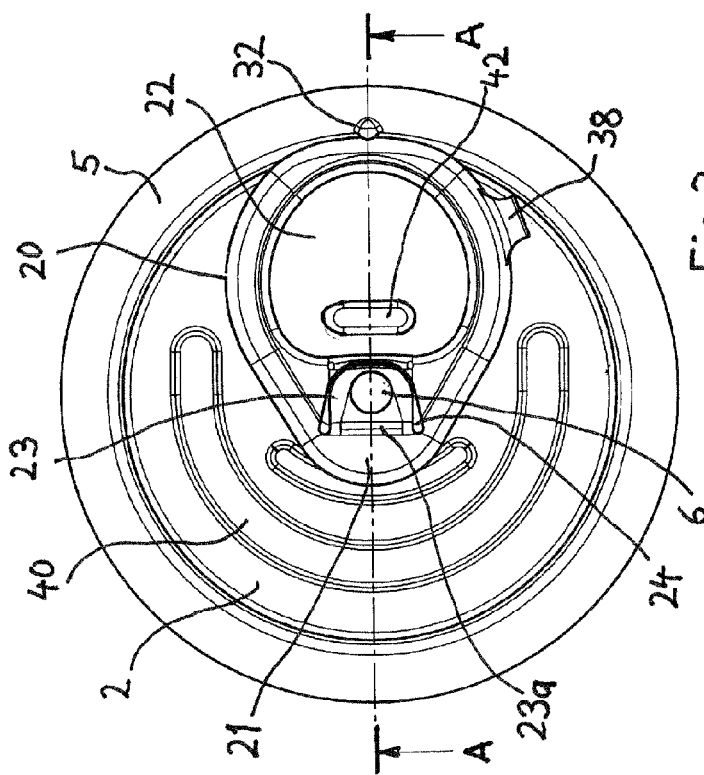
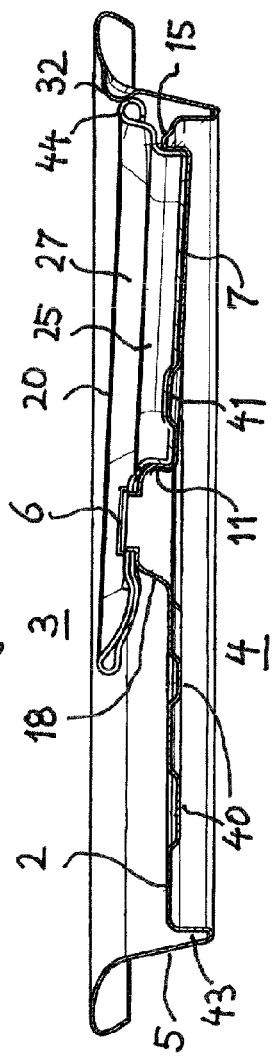

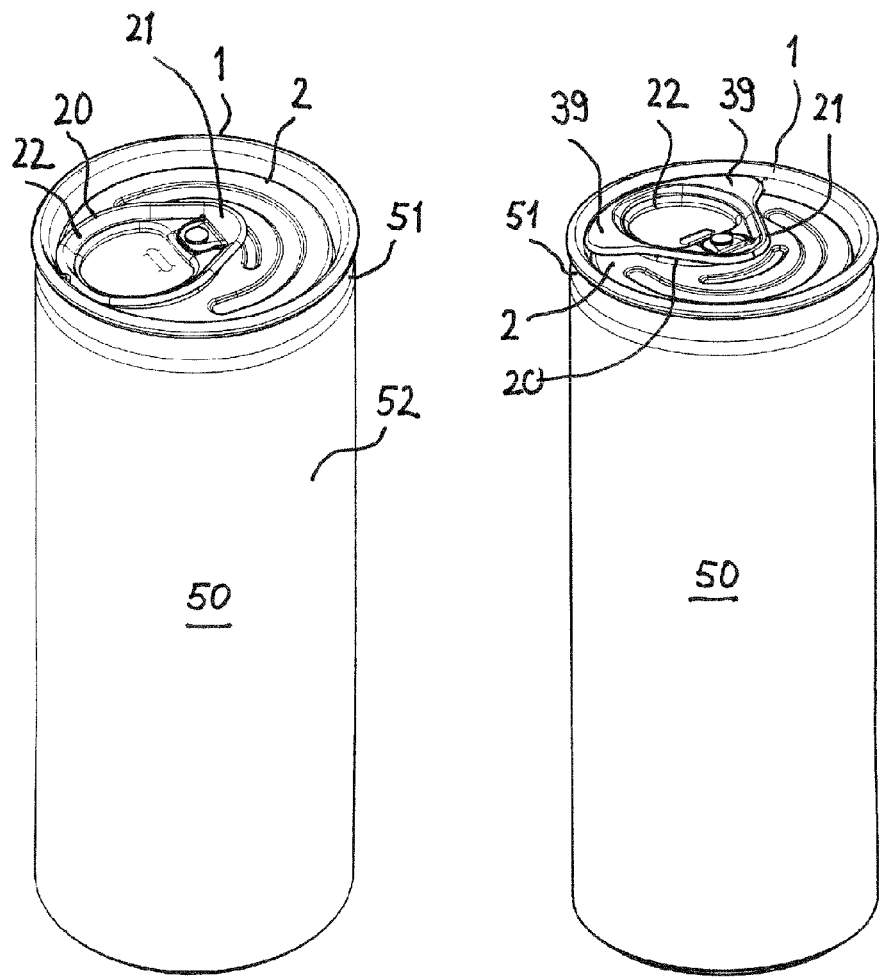

RE-CLOSABLE CAN END LID WITH A ROTATABLE OPENING AND RE-SEALING TAB AND DRINK CAN EQUIPPED WITH THE RE-SEALABLE CAN END LID

TECHNICAL FIELD

The present invention refers to a re-sealable can end lid for a can, in particular for a drink can, as well as a drink can having such a can end lid. The can end lid includes a lid plate with a break-away area, in which a break-away portion is circumferentially defined by a predetermined breaking line, and an opening tab that is equipped with a fastening tongue between a press portion and a grip portion. The fastening tongue is rotatably fixed onto the lid plate by means of a fixing stud. The fastening tongue is arranged in a portion of the opening tab between the press portion and the grip portion, its base integrally formed onto the press portion so that the fastening tongue may be bent to and fro around its base. In this way the press portion, rotated into an opening position of the opening tab, may be pressed down onto the break-away portion until the break-away portion will be separated from the can end lid plate along the predetermined breaking line, thus providing an aperture in the can end lid plate. The grip portion includes a downwardly protruding sealing attachment. The aperture may be sealed again by the sealing rim of the sealing attachment after rotating the opening tab around the fixing stud into a closing rotating position and pressing down the grip portion into a sealing position.

Lid plate and opening tab may be of variably thin sheet material even of different sheet material, like plastic material that may be fibre reinforced and/or like metal material that preferably may be a thin sheet shaped by means of a forming technology like injection moulding or the like, and/or by means of pressing, stamping, die cutting, deep-drawing and flanging. The material thicknesses of the can end lid plate and of the opening tab are basically constant. An elevation on the upper side of the can end lid plate or of the opening tab thus corresponds to a recess or depression similar in shape in the underside of the can end-lid plate and opening tab, respectively, and a depression or recess in the upper side corresponds to protruding attachment similar in shape on the underside. Preferably the fixing stud is a hollow rivet extruded from the material of the can end lid plate. However, a rivet or the like fixed onto the can end lid plate at a later stage may also be used as a fixing stud.

The lid plate comprises an outer peripheral wall on the upper side of the lid plate used for fixing the lid plate onto the open side walls of the can. This peripheral wall extends point symmetrically around an axis and is at least approx. cylindrical for cylindrical cans. If we refer in this description of the invention to angles in relation to the lid plate or to the upper side of the lid plate we mean an angle in relation to a reference level that is perpendicular to the specified axis of symmetry, generally also to be understood as the lid plate axis in the center of the lid plate.

The fixing stud may be disposed in the center of the lid plate or may be disposed eccentrically on the lid plate, that is in a position at a distance to the center of the lid plate.

A can end lid according to the present invention may be used on containers for any flowable product like powders or grainy products, e.g. coffee- or cocoa powder, soup powders or any instant powders or household grains, or in particular containers for liquids that may also contain solids, e.g. a drink liquid, liquid stock or soup, an oil or the like. A can end lid according to the present invention may also be used on other liquid or powder containers containing for example a liquid, powder or grainy cleaning agent or treatment agent or the like.

RELATED PRIOR ART

Can end lids of the type described before are vastly known. They are equipped with a grip portion on the underside of which there is a sealing attachment that fits into the aperture, which has been created by breaking the break-away portion, after rotating the opening tab into the closing rotating position so that the aperture may be closed again by pressing down the sealing attachment into the aperture. However, there are two major problems with this type of can end lids: one the one hand to create a design that renders the can end lid suitable for mass production and on the other hand to obtain sufficient leak tightness of the sealing attachment particularly, if the aperture shall be opened and closed repeatedly for multiple uses of the can. To this end, the shape of the sealing rim on the sealing attachment must be tightly shaped to the edge of the aperture and thus to the predetermined breaking line that determines the aperture edge. Furthermore there may be on the one hand deformations within the break-away portion and thus a dislocation of location and run of the aperture edge caused when breaking the break-away portion, and on the other hand there may be a dislocation of the sealing rim of the sealing attachment in relation to the aperture resulting from a permanent bending deformation of the opening tab fastening tongue caused by bending it to and fro when lifting up and swivelling back the opening tab before and after breaking the break-away portion. This all may result in the sealing rim on the sealing attachment does not fit into the broken-out aperture anymore, so that the defining edge of the aperture becomes deformed and the leak-tightness of the sealing attachment is impaired.

State-of-the-art prevention of the deformations of the break-away portion is its stiffening by means of rib-shaped beading or groove-like flaring on the lid plate around the break-away portion. According to U.S. Pat. No. 4,463,866, for example, there is a stiffening bead surrounding the break-away portion on three sides and extending beyond either side of the fixing stud. Furthermore the bowl-shaped sealing attachment is coated with a flexible material on its circumferential surface effective as a sealing rim to improve the leak-tightness in cooperation with the defining edge of the broken-out aperture, into which the sealing attachment is pressed after the grip portion is swivelled into the closing rotating position. The grip portion is fitted with a sticking out circumferential flange resting on the stiffening bead when closed. However, the coating on the sealing attachment may be breached on the sharp edge of the aperture which increasingly distorts the leak-tightness when using the sealing attachment repeatedly.

According to further suggestions, like for example in U.S. Pat. No. 4,442,950 and U.S. Pat. No. 6,059,137, the sealing of the aperture, into which the sealing attachment is pressed with the grip portion being in closing rotating position, is improved additionally by a sealing ring between the sticking out circumferential flange of the grip portion and a plane portion around the aperture on the lid plate. However, with this design as well, the leak-tightness may be detrimentally affected when the edge portion is deformed when breaking in the aperture and/or if the fastening tongue, by means of which the opening tab is attached onto the lid plate and by which the alignment of the sealing attachment with the aperture is determined, has been deformed in an unspecified manner by opening the can before. On the can end lid according to U.S. Pat. No. 6,059,137 there are two catching beads on the circumferential flange of the sealing attachment that are to set into underneath the edge of the aperture, when the grip portion is in closing rotating position, in order to press the circumferential flange tightly onto the surrounding aperture edge by means of a flexible friction contact. According to U.S. Pat. No. 4,442,950 an additional sealing ring on the sealing attachment will be pressed through the aperture to set-in on the underside of the aperture edge. Flexible set-in materials like these getting into contact with the aperture edge and becoming deformed when pressing them through the aperture during pressing down the sealing attachment may be damaged, when opening and closing the aperture, on the sharp edge of the aperture. Thus the efficiency of keeping down the circumferential flange onto the sealing ring and its tight pressing onto the surrounding rim portion of the aperture will be lost.

SUMMARY AND GENERAL PRINCIPLES AND ASPECTS OF THE PRESENT INVENTION

This invention results in a can end lid of the type mentioned at the outset, achieving an effective leak-tightness of the seal, even if it is opened and sealed several times, by means of simple design-features of the lid and of the can equipped with the lid that are suitable for mass production.

In a first design embodiment of this invention there is designed a ring-wall around the break-away area of the lid plate that has an inner contour located within a region of the lid plate between the fixing stud and the outside peripheral wall of the lid plate and that is, within this region, closed in itself in a ring-shaped manner. A recess with a bottom is surrounded by the ring-wall and the break-away portion is formed in the bottom of the recess. The outer shape of the sealing rim of the sealing attachment of the opening tab is complementary to the inner shape of the ring wall, the sealing rim engaging the inner side of the ring wall along its outer shape when the grip portion is in sealing position.

Other than in the state of the art, where, in the sealing position of the grip portion, the sealing rim of the sealing attachment is engaging the defining edge of the broken in aperture and, therefore, has its outer shape complementary to the inner shape of this defining edge, the sealing of the aperture in the first design embodiment of the invention is effected along the inner surface of a separate ring wall surrounding the aperture. Thus, leak-tightness of the sealing attachment of the first design embodiment of the invention does not rely on a linear shape sealing of the sealing rim of the sealing attachment on the thin defining edge of the aperture. Rather a surface to surface sealing will be effected between sealing rim and inner surface of the ring wall.

Furthermore, the invention sets the formation of the route of the predetermined break-line apart from the formation of the inside circumferential shape of the ring wall around the break-away area and thus de-couples it from the formation of outside circumferential shape of the sealing rim of the sealing attachment. Thus the shapes of ring wall and sealing attachment may be designed production congenially for an optimum sealing feature. At the same time, the predetermined break-line may be designed for an optimum breaking away of the break-away portion by means of the press portion of the opening tab, and may even deviate in its route from the route of the inside contour of the ring wall.

It is not required that the ring-wall is circular, although it may be circular. By ring-wall we generally rather mean a wall that is closed in itself in a ring-shaped manner and that for example in particular on the side facing the fixing stud, that is located outside the break-away portion surrounded by the ring-wall, may be more or less straight. Correspondingly, also the sealing rim on the contour of the sealing attachment follows the route of the inside wall of the ring-wall and is closed in itself.

Due to the stiffness of the ring-wall, that is as to its height at an angle to the upper side of the lid plate, the sealing surface is not prone to deformations due to forces exercised on the lid plate area outside the ring-wall, including the surrounding area of the fixing stud for the opening tab, and due to forces exercised on the bottom area within the ring-wall when breaking in the break-away portion. Preferably, the ring-wall on at least its upper edge is at an angle of 90 degrees in relation to the upper side of the lid plate and thus ideally runs with its surface lines parallel to the axis of the peripheral wall of the lid plate.

Furthermore, the smooth inner surface of the ring-wall has also an aligning effect on the circumferential wall of the sealing attachment when pressing it down into the aperture. Due to this, even dislocations of the sealing attachment caused by unspecified bending of the opening tab fastening tongue, that may have occurred when breaking in the break-away portion, will be compensated for and reversed. This will also be achieved, like in a further embodiment of the invention, if the inside surface of the ring-wall or the sealing rim of the sealing attachment is coated with a thin layer of sealant.

By the designs of the invention, the sealing attachment sinks into the recess surrounded by the ring-wall, when the grip portion is in the sealing position, and engages with its sealing rim onto the inside surface of the ring-wall to close the aperture. The predetermined break-line, however, surrounding the break-away portion is on the bottom of the recess. For the purpose of this description of the invention the bottom of the recess is meant to be the total floor area of the area within the ring-wall by which in its turn the break-away area of the lid plate is specified. Within this floor area itself elevations may be integrated. In this case corresponding recesses may be provided in the underside of the closing-attachment forming wall, into which such elevations of the floor area might protrude, e.g. with a clearance, when the sealing attachment dips into the inner area of the ring wall in the sealing position of the opening tab grip portion. Such an elevation may be an advantage, for example, to keep the swivel angle of the opening tab small when breaking in the break-away portion, as the press portion presses onto such an elevation when the opening tab is in opening position to break in the break-away portion. For example, the break-away area may be bulged on its inner area at a distance to the ring wall, so that the recess on the outer area bordering on the inside of the ring wall is formed in a ringtorus shape.

By means of such a complementary or at least almost complementary matching of the floor area of the inner area surrounded by the ring wall on the one hand and the underside of the sealing attachment on the other hand, the sealing attachment may lock into the inner area without colliding with elevations in the floor area, before the break-away portion has been broken in, thus before opening the can fitted with this can end lid. In particular for drink cans this provides the option to protect the break-away area of the lid plate for reasons of hygiene already during packing, shipping and storing of the can, by disposing the opening tab into the closing rotating position and by pressing the grip portion with the sealing attachment down into the sealing position and, therefore, into the recess surrounded by the ring wall. In this way the area of the lid that is touched by the lips for drinking after the can has been opened will be efficiently protected against soiling, in particular if the opening tab grip portion is preferably fitted with a circumferential flange clamping radially over the ring wall.

The recess surrounded by the ring wall may be formed into the upper side of the lid plate in such a way that the outer area of the lid plate outside the inner side of the ring wall is basically plane. For an expedient design of the invention the ring wall is made up—at least in its upper portion and at least along the larger part of its contour—by the inner wall of a ring bead protruding on the upper side of the lid plate contour. Thus the ring wall may be formed solely by a steep inner flank of a ring bead protruding from the upper side of the lid plate, its apex line being rounded in cross-section, so that the heights of the inner and the outer flanks of the ring bead are the same. However, it is to be preferred to increase the height of the inner side of the ring wall at least along the longest circumferential portion of the break-away area facing away from the fixing stud. In this way, the sealing surfaces and/or the guiding surfaces for aligning the sealing attachment on the inside of the ring wall are being enlarged by means of the ring wall extending deeper down than the inner flank of the ring bead. By means of such a height increase of the ring wall it may also be arrived at, that the sealing attachment of the grip portion of the opening tab is slightly jammed on the ring wall in its sealing position keeping the sealing attachment form-fit and friction-fit within the ring wall. With such a layout the ring bead may be circumferentially interrupted on the side facing the fixing stud and may be extended by bead arms on either side of the fixing stud for additional stiffening of the lid plate within the region around of the fixing stud, for example. Preferably however, the ring bead at the portion of the break-away portion facing the fixing stud is closed in its self as well.

It is to be preferred that the ring wall has straight surface-lines on its inside. Correspondingly the surface lines on the sealing attachment within its sealing rim are preferably straight as well. As already mentioned above, the ring wall that protrudes at an angle from the upper side of the lid platelid may run along its surface-lines preferably parallel to an axis of symmetry to which the peripheral wall of the lid platelid is orientated. Correspondingly the surface-lines of the sealing rim of the sealing attachment are parallel to one another and basically perpendicular to the upper side of the opening tab grip portion. When the grip portion is pressed down into the sealing position in the closing rotating position of the opening tab, the sealing attachment of the grip portion will be swivelled down into the recess surrounded by the ring wall along a swivel curve the radius of which will be determined by the distance to the basis of the fastening tongue on the press portion, since the fastening tongue will be bent around this basis when the grip portion moves down. This deflection line along the basis of the fastening tongue is located on the side of the fixing stud facing away from the grip portion of the opening tab when the opening tab is in its closing rotating position. Furthermore the fastening tongue is not completely weak for bending, resulting in generating an elastic reset force by means of which the sealing attachment is slightly tilted against the ring-wall in the recess surrounded by the ring-wall. Due to this, the sealing attachment is jammed onto the ring-wall when the grip portion is in sealing position. This keeps the sealing attachment in a form-fit and due to the friction in a force-fit position when the grip portion is in the sealing position.

Instead of aligning the ring-wall with its surface lines parallel to the axis of symmetry of the peripheral wall of the lid plate, the surface lines may be tilted at an angle of up to 5 degrees in relation to the parallel, preferably up to 3 degrees, so that the ring-wall, seen from the upper edge of the recess surrounded by the ring-wall down to the bottom of the recess, as well as the sealing rim of the sealing attachment, seen from its bottom end, extend along their height undercut by an angle of 3 to 5 degrees. This means that the recess at its bottom end has a larger diameter than at its top end and that, correspondingly, the sealing attachment has a longer diameter at its bottom end than at its top end. This design further increases the retaining force by which the sealing attachment is kept in its sealing position.

Another design option of the invention is to mount the fixing stud onto a pedestal like elevation on the upper side of the lid plate. This, on the one hand, stabilises the fixing stud, since the lid plate is stiffened by the pedestal like elevation. On the other hand, the alignment of the swivel curve can be positively influenced relatively to the alignment of the ring-wall when pressing the grip portion down into its sealing position, because due to the elevated mounting of the fixing stud the fastening tongue basis that is the swivel axis of the swivel curve of the grip portion is elevated. Thus the higher location of the fixing stud may improve the alignment effect of the ring-wall as well as the jamming effect onto the sealing attachment.

Moreover, by means of an elevated position of the fixing stud it may be provided for that the grip portion of the opening tab with its end facing away from the fixing stud resting on the lid plate may be obliquely sloping down to the lid plate. This may additionally taken advantage of in such a manner that the grip portion may be elastically pressed onto the lid plate by the fastening tongue when the opening tab is in the closing rotating position and/or in the opening rotating position. To this end, the fastening tongue may be aligned to the fixing stud at a small angle of 1 to 4 degrees upward above the upper side of the opening tab before riveting. After riveting the grip portion will thus be aligned tilting downwards accordingly in relation to the fastening tongue and during riveting the fastening tongue will be flexibly bent back by the grip portion resting on the lid plate.

The elevated positioning of the fixing stud allows for an additional design feature, i.e. to tilt the upper surface of the pedestal elevation sloping downwards towards the break-away area. This tilt of the upper surface of the pedestal elevation is preferably at an angle of 1 to 4 degrees, in its expedient form at an angle in a range of 2 degrees. Due to the tilt of the upper surface of the pedestal elevation, the grip portion of the opening tab will be moved and aligned tilting downwards when rotating it from its opening rotating position into its closing rotating position. In this way, the alignment effect of the ring-wall and of a ring bead—if present—as well as the jamming effect of the ring-wall onto the sealing attachment, when it is in closing rotating position, may be enhanced when pressing down the grip portion into the sealing position. In this situation, moreover, the press portion of the opening tab is positioned higher above the lid plate on the side of the fixing stud facing away from the grip portion in the sealing position thereof. This may be used to be able to lever out the grip portion of the opening tab from its sealing position, when opening the sealing attachment again, by pressing down the press portion.

An elevated positioning of the fixing stud onto a pedestal elevation allows further that the fastening tongue, that has been bent around the basis of the fastening tongue by pressing down the press portion of the opening tab when breaking in the break-away portion, can be bent back further into a position, in which the angle, by which the grip portion is swivelled down out of the closing rotating position of the opening tab, becomes as small as possible. To this end, the upper surface of the pedestal elevation preferably has a breadth that is smaller than the clearance width of the cut-out of the opening tab in which the fastening tongue is formed. Due to this, the fastening tongue being in opening rotating position, in which the base of the fastening tongue is positioned between the fixing stud and the break-away area, may be bent back by pressing down the grip portion of the opening tab, preferably to such an extent that the fastening tongue is above the level of the cut-out, because the upper portion of the pedestal elevation fits through the cut-out. Preferably, the breadth of the pedestal elevation corresponds, at least in its upper portion, with the breadth of the fastening tongue.

Preferably, the area of the lid plate surrounding the ring-wall is sloped at the same degree as the upper surface of the pedestal elevation. In this way the tilt angle, by which the sealing attachment is tilted by the alignment effect of the ring-wall when entering the recess surrounded by the ring-wall and thus the jamming effect of the ring-wall onto the sealing attachment, may be enhanced further. In such a design as well the alignment of the surface-lines of the inside of the ring-wall parallel to the axis of symmetry of the peripheral wall of the lid plate or the undercut alignment at a small angle in relation to the parallel alignment of the surface-lines of the ring-wall will preferably be maintained.

For the formation of the pedestal elevation, onto which the fixing stud is mounted, the ring bead, provided there is a ring bead that enhances the effective height of the ring-wall, may be bellied in the direction facing away from the break-away area.

Designing the lid plate in such a way that the break-away-portion is surrounded, at least along the circumferential side facing away for the fixing stud, by a steep inner face of a ring bead protruding from upper side of the lid plate, and that the fixing stud is mounted on a pedestal elevation on the upper side of the lid plate above the break-away portion may even be used, in a second design form of the invention, independently of the ring-wall being present. The alignment effect onto the sealing attachment, as explained before, of such a ring bead with a steep inner face may also be of an advantage, if the sealing rim of the sealing attachment is fitted to the inner contour of the aperture created when breaking in the break-away portion. Above explanations and designs of the invention in conjunction with the elevation of the fixing stud, the flexible pressing down of the grip portion on to the lid plate, the slightly tilted design of the upper surface of the pedestal elevation, the somewhat sloping design of the lid plate surface surrounding the ring bead, the design of the pedestal elevation onto a bellying of the ring bead and the closed ring-wall design between the break-away portion and the fixing stud therefore apply respectively also to the second design of the invention.

In a further design of the invention, the break-away portion on the bottom of the recess is bordered by a ring shaped inner angular edge that will be overlapped by a ring shaped outer angular edge of the sealing attachment of the grip portion, when the grip portion is in sealing position. The inner angular edge or the outer angular edge may be coated with a sealing material. Preferably in this case, the inner angular edge is concavely rounded in cross-section on its inner side and the outer angular edge is convexly rounded in cross-section on its outer side. Between the contour of the predetermined breaking line surrounding the break-away portion and the inner contour of the ring-wall there is a radial clearance in this design. In this way there will be created a flange-like inner edge on the bottom of the recess surrounded by the ring-wall. The closed ring shaped inner angular edge is formed jointly by such an inner edge and the bottom edge of the inner face of the ring-wall. By coating the inner angular edge at the lower end of the ring-wall or coating the complementary outer angular edge with a sealing material an improved sealing effect may be achieved, in particular for cases where a drink in a re-closable can contains a propellant agent like carbonic acid.

In particular for such a design with an inner angular edge as well, the recess may be shaped as a shallow trough into a lid plate area surrounding the recess that is generally plane. The depth of the recess, in principle, may be the same as the height of the inner angular edge or higher than the inner angular edge, thus providing, due to a correspondingly higher ring-wall, a larger sealing surface achieving improved alignment and jamming effects of the ring-wall.

In an other preferred design of the invention, a detent is formed, projecting from the peripheral wall of the lid plate on the side of the break-away portion facing away from the fixing stud, the detent, in the sealing position of the grip portion of the opening tab, effects jointly with the circumferential flange the locked keeping down of the sealing attachment in the recess. The circumferential flange of the sealing attachment of the opening tab is designed in such a way that it is located with its outer edge close to the peripheral wall of the lid plate, after rotating it around the fixing stud, that may also be positioned eccentric to the axis of the peripheral wall of the lid plate. The detent may be pressed into the peripheral wall from the outside of the peripheral wall along a limited circumferential length of the wall. However, it is also possible to design the detent as a circumferential portion of a circumferential bead, pressed, for example, into the peripheral wall from the outside thereof along the total circumference of the wall.

Designing the invention with such a detent on the peripheral wall of the lid plate allows for the grip portion of the opening tab to be retained pressed down into its sealing position with a high sealing effect. This design of the invention is preferably seen in combination with a ring-wall, in particular also in combination with the design, where the break-away portion on the bottom of the recess surrounded by the ring-wall is circumferentially bordered by an inner angular edge, as described above. Yet such a detent on the peripheral wall of the lid plate may be efficiently employed independently of the presence of the ring-wall, if the sealing rim of the sealing attachment is adapted directly to the aperture created by the breaking in of the break-away portion. In such a design, where the sealing attachment, in sealing position of the grip portion of the opening tab, sinks into the created aperture, the closing effect is achieved by direct interaction of the sealing rim of the of the sealing attachment with the surrounding edge of the broken in aperture. An additional feature could be that the circumferential flange of the sealing attachment jointly seals with the area of the lid plate surrounding the aperture, wherein a sealing ring between the circumferential flange and the lid plate can be provided.

Designing the invention with a detent on the peripheral wall on the lid plate is especially also enhancing in a design, where the fixing stud, and thus the fastening tongue of the opening tab as well is mounted on a pedestal elevation on the upper surface of the lid plate at a distance to the break-away area. Because by means of the elevated mounting of the fastening tongue of the opening tab it may be achieved that its grip portion in closing rotating position will be pressed at a tilt into the sealing position, wherein the detent or locking lip on the peripheral wall may be disposed at a lower position. In this case it is preferred as well that the upper side of the pedestal elevation is tilted at a downward slope towards the break-away area, wherein the area of the lid plate surrounding the break-away area is correspondingly tilted toward the portion of the peripheral wall with the detent. In the latter case, the level of the apex line of the ring bead, if this ring bead is present, may be at a tilted level corresponding with the tilt of the upper surface of the pedestal elevation that is tilted at a downward slope toward the portion of the peripheral wall with the detent.

Such a detent on the peripheral wall of the lid plate in combination with the ring-wall or without the ring wall may even be used expediently on the design as described before, if the sealing rim of the sealing attachment is directly adapted to the shape of the aperture edge created by the breaking in of the break-away portion.

Since the opening tab of a re-closable drink can is bent to and fro several times along the basis of the fastening tongue of the opening tab, when breaking in the break-away portion by means of the press portion and pressing the sealing attachment into its sealing position, we propose a further feature of the invention, i.e. reinforcing the press portion and the fastening tongue of the opening tab formed thereat by folding back a blank extension portion of the fastening tongue under the press portion and the fastening tongue. This in particular reinforces as well the basis on which the fastening tongue is bent to and fro. This prevents the breaking of the fastening tongue along its basis even if it is bent to and fro several times.

Furthermore, by doubling up the press portion and the fastening tongue, the bending stiffness against a permanent bending deformation will be increased, thus enhancing the elastic component of the bending deformation. This again increases the reset force counteracting the pressing down of the grip portion into sealing position that may be utilised for jamming the sealing attachment against the ring-wall as described earlier. The stiffening according to the invention of the fastening tongue may, however, be expedient even for lid constructions that do not comprise a ring-wall according to the present invention.

Preferably the folded back blank extension is strip-shaped and has arms projecting out on either side that are crimped into the side edges of the grip portion and has a tongue-shaped end-portion identical with the shape of the fastening tongue and jointly fixed therewith in a rotatable manner onto the fixing stud.

Apart from the designs of the can-end lid according to the invention described so far, other features may be provided. In particular, the lid plate and/or the opening tab may be stiffened by means of depressed stiffening grooves and/or elevated stiffening beads and the like on their upper sides.

It may also be provided for a receiving recess for the sealing attachment that is formed into upper side of the lid plate on the side of the fixing stud facing away from the break-away area. The sealing attachment of the opening tab in its opening rotating position may set into such a receiving recess, so that the opening tab in its opening rotating position rests onto the lid plat as flat or low as possible. In this case there may also be such a detent provided for on the peripheral wall of the lid plate within the region of the receiving recess that jointly with the circumferential flange of the grip portion keeps the grip portion down in the receiving recess.

Furthermore, if such a receiving recess is present, there will be a larger swivel angle by which the opening tab in its opening rotating position may be swivelled back after breaking in the break-away portion. For, if the receiving recess is present, the sealing attachment may set into the receiving recess before it sets onto the upper side of the lid plate when it is swivelled back. By means of such a larger swivel angle, the fastening tongue may be redressed or bent back as far as possible by swivelling out the press portion of the opening tab out of the aperture, which redressing may be enhanced by means of an elevated mounting of the fixing stud and thus the fastening tongue onto a pedestal elevation.

If such a receiving recess for receiving the sealing attachment in opening rotating position of the opening tab has not been provided for, it is to be preferred that there is at least an arch shaped stiffening depression formed on the side of the fixing stud facing away from the break-away portion on the lid plate.

The invention also relates to a drink can with a can end lid according to the invention that has been designed according to the invention with one or several features as described above. Preferably the grip portion of the opening tab on such a drink can includes a circumferential flange that protrudes over the ring-wall, when the opening tab is in the closing rotating position, wherein the opening tab, with the predetermined break-line being closed, i.e. before the break-away portion has been broken in along the predetermined break-line and separated from the lid plate, is in the closing position sinking into the recess surrounded by the ring-wall. In this way, the break-away area and the ring-wall, as well as the ring bead, if present, will be covered by the grip portion and its circumferential flange. Preferably in this case there is a detent provided on the peripheral wall with the circumferential flange of the grip portion locking on the underside of the detent. As already explained further above, such a drink can has the advantage that the area of the lid, where the user breaks in the break-away portion and where the consumer's lips touch when drinking, is covered against soiling during shipping and storing. This also prevents to a large extent soiling the liquid flowing from this lid area. Such a protection may be further enhanced by enlarging the grip portion particularly on either side of a circumferential flange thereof in a region neighbouring the peripheral wall when the grip portion is in its closing rotating position.

Furthermore the invention is concerned with a process for manufacturing a lid for a can, particularly for a drink can, and for mounting the lid onto an already filled drink can. In this process the lid plate and the opening tab are manufactured separately, preferably by pressing or punching, in the form required, after which the opening tab together with its fastening tongue will be riveted onto the fixing stud of the lid plate so that it may be rotated.

Riveting the fastening tongue onto the fixing stud is preferably done in a position of the opening tab containing the opening tab in the closing rotating position and the sealing attachment sunk into the recess surrounded by the ring-wall, preferably down to sealing position of the grip portion, where the sealing attachment of the grip portion with its sealing rim engages onto the inner face of the ring-wall.

After attaching the fastening tongue onto the fixing stud, the opening tab, if not yet in closing rotating position, will be rotated into the closing rotating position and lowered into the sealing position, if it has not yet been lowered into the sealing position. With the grip portion in its sealing position, the ring-wall and the circumferential wall forming the sealing rim of the sealing attachment will be repressed, preferably shock-like, jointly between an press die and a press ram.

In the course of this repressing the slight oversize of the press ram effects a stretching down of the material of the sealing attachment and of the inner side of the ring-wall along the overall circumferential sealing contour similar to a kind of plastic reshaping. This compensates for material unevenness and dimension irregularities and production tolerances, having occurred during the previous manufacturing process, to obtain the required form quality within the area of the jointly sealing surfaces of the sealing rim of the sealing attachment and the inner face of the ring-wall, and nestles the surfaces closer to one another. By means of a complementary forming of the sealing attachment, including its underside on the one hand and the inner face of the ring-wall and of the break-out area surrounded by the ring-wall on the other hand, it is seen to it that the predetermined break-line around the break-away portion will not be damaged during the repressing work.

The result of the repressing is a completed end lid, on which the sealing attachment is in the sealing position and is retained in the sealing position by the ring wall. If there is a pedestal elevation, onto which the fixing stud is mounted, its width being identical to the width of the fastening tongue, the fastening tongue has preferably already been set during the preceding shaping of the opening tab and prior to the riveting onto the fixing stud into a position, in which the fastening tongue protrudes at a slight angle of 1° to 3° in an inclined manner upward above the upper surface of the opening tab. In this way the grip portion of the opening tab will be retained at a corresponding down tilt after riveting the fastening tongue. Because of this, the fastening tongue will be slightly and elastically bent up by the grip portion resting on the lid plate and the fastening tongue exercises an elastic force downward onto the grip portion after riveting. Due to this, the grip portion of the opening tab can not move inadvertently out of the sealing position and interfere in the following manufacturing processes.

This is not contrary to that in the preferred design of the invention there should be a certain elastic bending deformation of the fastening tongue when the grip portion is in its sealing position in order to jam the sealing attachment inside the ring-wall after closing the can again. For by pressing down the press portion when breaking in the break-away portion, the fastening tongue will be bent into such a direction, that the desired elastic deformation component of the fastening tongue is retained when subsequently pressing down the sealing attachment into the sealing position.

Preferably, after the repressing step, the peripheral wall of the lid plate will be fixed form-fit, for example by means of a flanging technique, onto the can end, the can already being filled, with the opening tab after repressing being in a position, in which the grip portion is in its sealing position. In this way the completed can has been created for further processing, packaging and shipment in the preferred state wherein the area of the lid where the drinking aperture will be created is covered to a large extent against soiling during packaging, shipment and storing in a manner as explained further up. Since, according to the invention, the lid may be fixed onto the can end in a state where the sealing attachment dips into the recess surrounded by the ring-wall, although the break-away portion has not yet been broken in along the predetermined break-line, the closed can may be processed further, packaged and stored in a state in which the sealing attachment is in this sealing position where the opening tab rests on the lid plate in a flat manner.

BRIEF DESCRIPTION OF THE DRAWINGS

Following, the invention will be illustrated by means of preferred embodiments with their features being evident in the drawings. In the drawings:

FIG. 2 is a top view of the lid as of FIG. 1, wherein the opening tab of the lid is in its opening rotating position, FIG. 3 a top view of the lid as of FIG. 2, wherein the opening tab of the lid is in its closing rotating position, FIG. 4 a cross-section of the lid as of the cross-section line A-A in FIG. 3, FIG. 5 a perspective view of the lid plate of the lid as of FIG. 1 without opening tab, FIG. 6 a cross-section of the lid as of FIG. 5 without opening tab along the cross-section line A-A in FIG. 3, FIG. 7 the detail C, encircled in FIG. 6, at a larger scale, FIG. 8 the right half of the cross-section of FIG. 6 at a larger scale with angle values entered, FIG. 9 a top view of the opening tab of the lid as of FIG. 1, FIG. 10 a side view of the opening tab as of FIG. 9, FIG. 11 a bottom view of the opening tab as of FIG. 9, FIG. 12 a cross-section of the opening tab as of the cross-section line D-D in FIG. 9, FIG. 13 a perspective bottom view of the opening tab as of FIG. 11, FIG. 14 the encircled detail E of the opening tab in FIG. 13 at a larger scale, FIG. 15 a top view similar to that in FIG. 3 onto a lid according to the invention in a modified design version, FIG. 16 a cross-section similar to that in FIG. 4 through the modified lid along the cross-section line F-F in FIG. 15, FIG. 17 a perspective view of a drink can with a can end lid design according to the invention as that of FIG. 1, FIG. 18 a drink can with a can end lid according to the invention in a modified design, and FIG. 19 a repressing tool in a state during repressing of a lid as of FIG. 1 to explain a production process according to the invention.

DETAILED DESCRIPTION OF PREFERRED EMBODIMENTS

Figure 1:
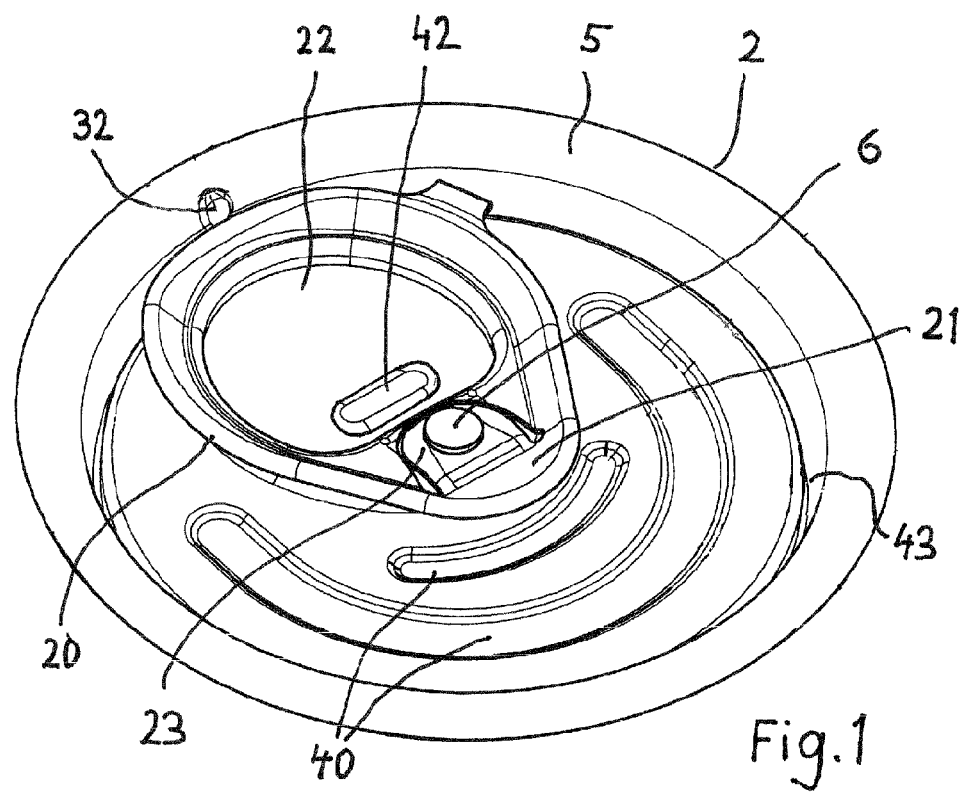
FIG. 1 is a perspective view of the upper side of a can end lid according to the invention for a drink can in a first design.

FIGS. 1 to 14 show a design of a lid according to the invention for a can, particularly a drink can, that according to FIGS. 1 to 14 has a lid plate (2) and an opening tab (20) mounted onto a hollow-rivet fixing stud (6), so that it may be rotated, that protrudes on the upper side (3) of the lid plate (2) mounted, in this design, in the centre of the lid plate (2). The lid plate (2) has a peripheral wall (5) for fixing the lid onto the open can end of a can, as well as a centre plate area that is separated from the peripheral wall by a deep circumferential groove (43). The peripheral wall (5) extends point symmetrically around an axis (14) (see FIG. 8) being the lid axis at the same time.

At one side of the fixing stud (6) there is a break-away area (7) with a predetermined break-line (9), that surrounds a break-away portion (8) at least to a most extent, on the lid plate (2) between the fixing stud and the ring groove (43), so that the predetermined break-line (9) breaks by pressing down the break-away portion, whereby an aperture is formed in the lid plate (2). The opening tab (20) is fixed onto the fixing stud (6), so that it may be rotated, by means of an fastening tongue (23) formed on its basis (23*a*) onto the opening tab (20) between a press portion (21) and a grip portion (22). Due to this, the opening tab (20) may be rotated around the fixing stud (6) on the lid plate (2) and be bent up and down in a swivelling manner around the basis (23*a*) of the fastening tongue (23).

Thus the opening tab (20) may be rotated into an opening rotating position, as shown in FIG. 2, and may then be swivelled down with its press portion (21), by lifting its grip portion (22), onto the break-away portion (8) to break it in. On the other hand, broken out aperture, broken in by the grip portion (22) out of the predetermined break-line (9) may be sealed again, as shown in FIGS. 1 and 3, with the opening tab (20) being in closing rotating position, by swivelling down the grip portion (22) into a sealing position as shown in FIG. 4.

Figure 5:
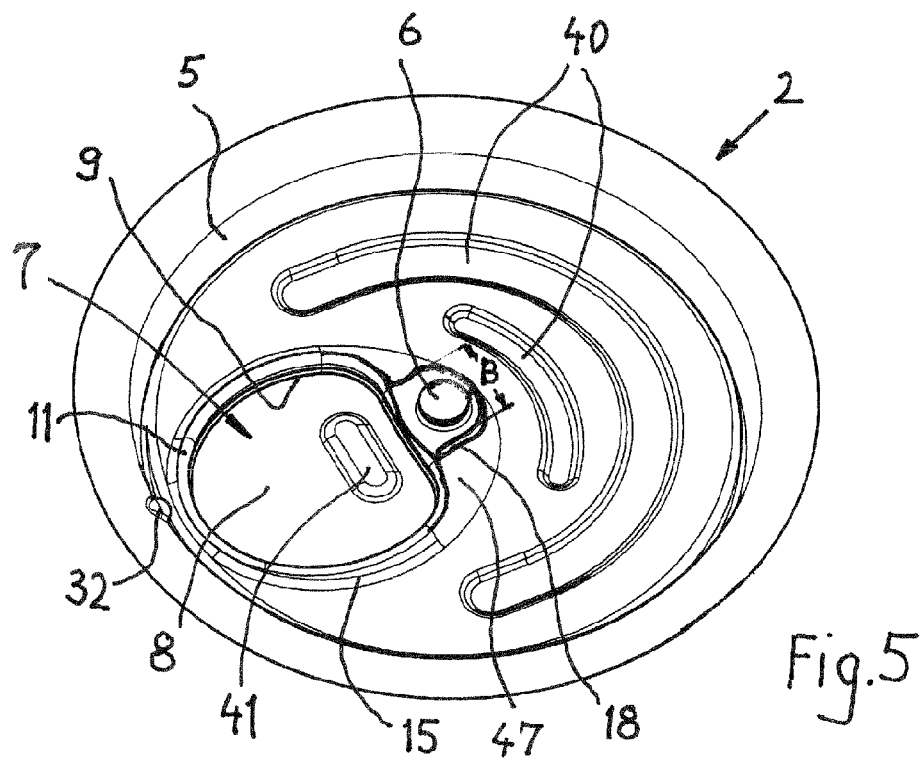
Figure 6:
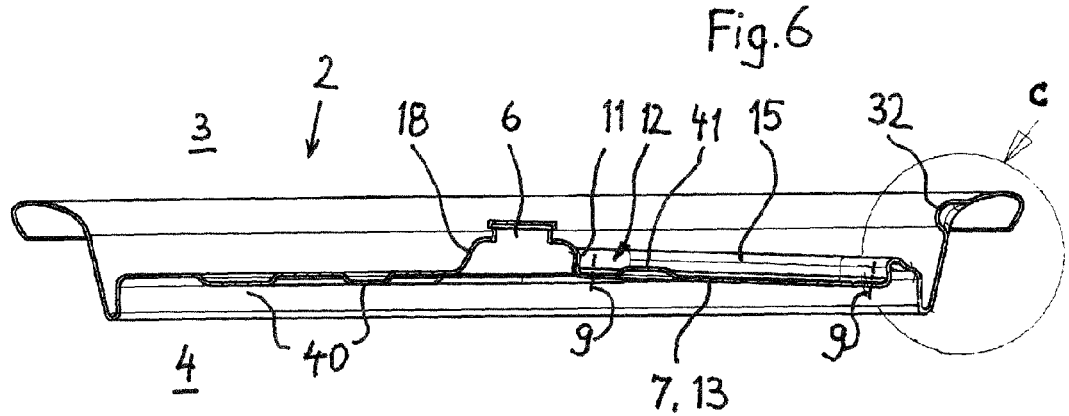
Figure 7:
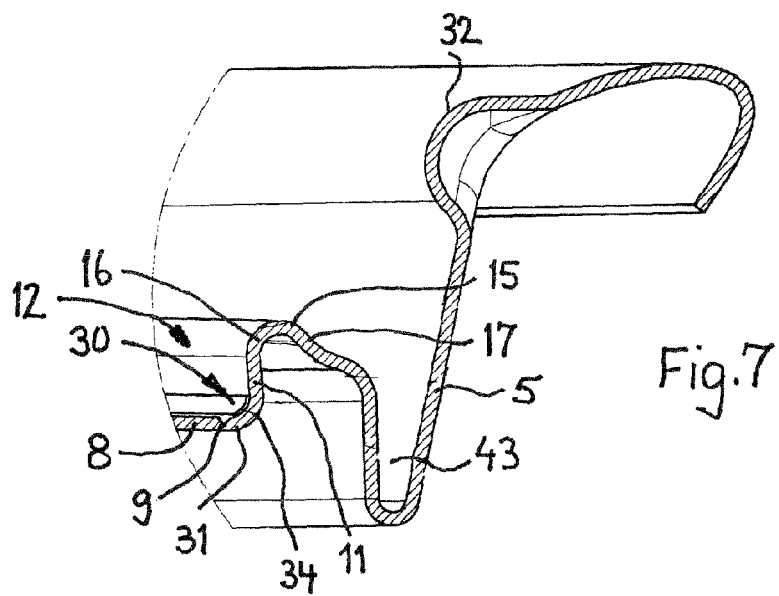
Figure 11:
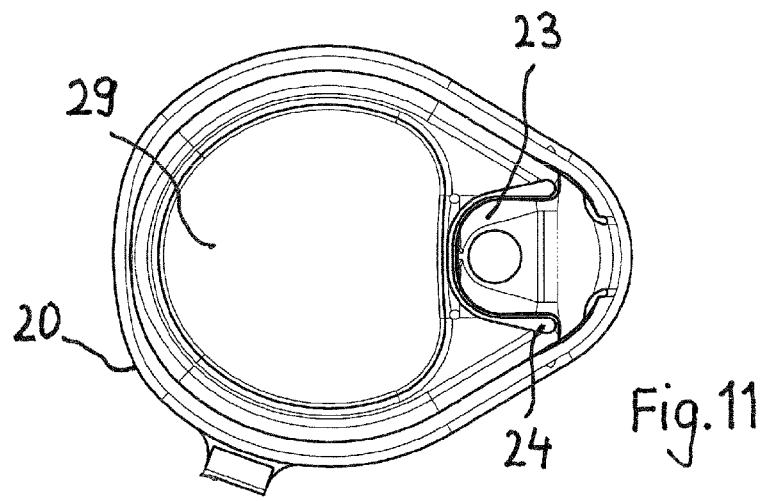

As shown in particular in FIGS. 5 to 7, there is a ring-wall (11) around the break-away area (7) with the predetermined break-line (9), the ring-wall formed by depressing a recess (12) into the upper side (3) of the lid plate (2) as a surrounding wall defining the recess (12), thereby protruding at an angle to the lid plate (2) on the bottom side (4) of the lid plate. The ring-wall (11) has an internal contour along its inner face that is closed in itself like a ring between the fixing stud (6), mounted outside the circumferential contour of the ring wall (11), and the peripheral wall (5). The break-away area (7) is formed by the bottom (13) of the recess (12), meaning that the break-away portion (8) and the predetermined break-line (9) are on the bottom of the recess (12). As in particular results from FIG. 6, the recess (12), in the design shown, is in each case basically rectangular as to its cross-sections.

As may be seen in particular in FIGS. 9 to 15, a downwardly protruding sealing attachment (25) is formed on the underside of the grip portion (22) of the opening tab (20) that is shaped complementary to the recess (12) that is surrounded by the ring-wall (11) of the lid plate (2). The sealing attachment (25) in the designs form shown is rectangular as to its side views and has a sealing rim (26) that extends, closed in itself like a ring, along the outer circumferential contour of the sealing attachment (25), and that has its outer circumferential contour complementary to the inner circumferential contour of the inner face of the ring-wall (11). Furthermore, the underside (29) of the sealing attachment (25) is complementary to the upper side of the bottom of the recess (12) defining the break-away area (7).

Thus the sealing attachment (25) of the grip portion (22) of the opening tab (20), when in the sealing position of the grip portion, fits into the recess (12) in such a way that the smooth sealing rim (26) fits closely onto the smooth inner face of the ring-wall (11), as this can be seen in FIG. 4 for example. Thus, the aperture, created by the breaking in of the break-away portion (8) out of the predetermined break-line (9), may be tightly sealed again by the sealing attachment (25), without the circumferential contour of the sealing attachment having to be—adapted to the circumferential contour of the aperture itself.

Figure 19:
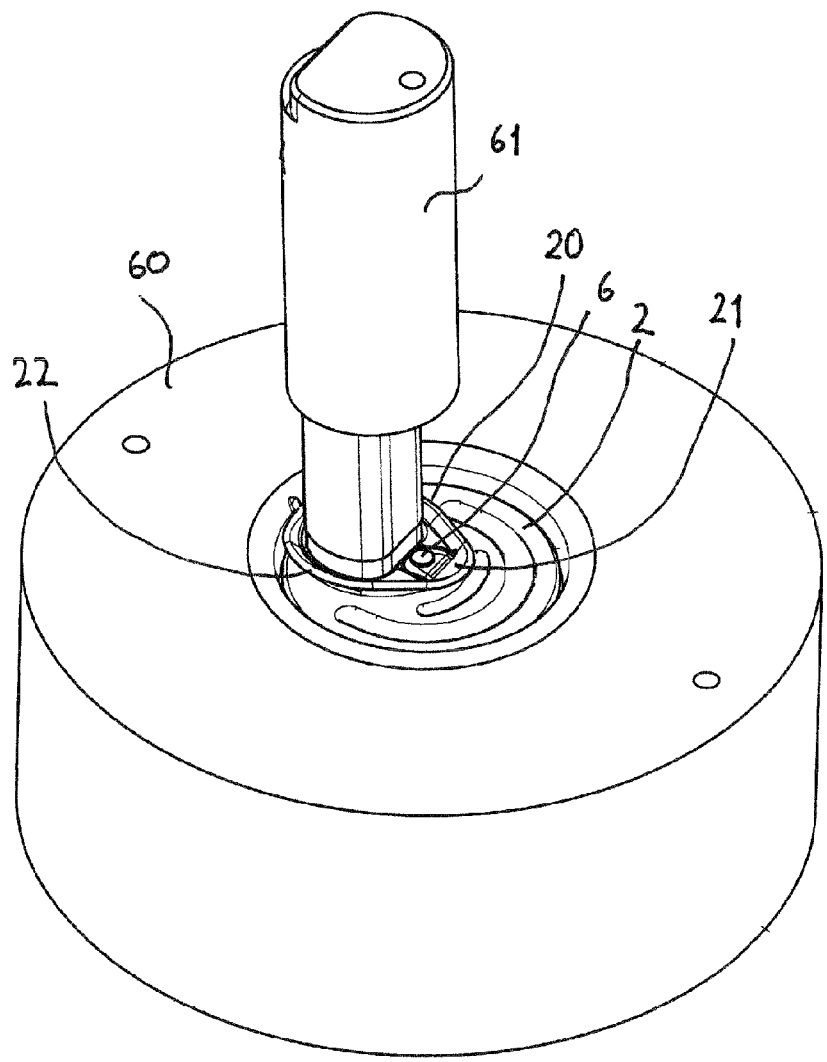

The circumferential contour shape of the predetermined breaking line (9) is smaller than the internal circumferential contour shape of the ring-wall (11). As seen in FIG. 7, this creates an internal flange rim (31) between the predetermined break-line (9) and the bottom end of the ring-wall (11), thus forming a concave rounded inner angular edge (30) jointly by the internal flange rim (31) and the lower portion of the ring-wall. Complementary to the inner angular edge (30) there is a convex rounded outer angular edge (28) on the sealing attachment (25) of the grip portion (22) of the opening tab (20), as shown in FIG. 19, that engages into the inner angular edge (30) in a complementary manner when the grip portion (22) is in its sealing position. Therefore, the surfaces of the inner angular edge (30) jointly with the outer annular edge (28) of the sealing attachment as well as the smooth inner face of the ring-wall (11) jointly with the smooth sealing rim (26) of the sealing attachment (25) are separately or jointly disposable as sealing surfaces to effect an efficient sealing of the seal. As shown furthermore in FIG. 7, the inner angular edge (30) is coated with a sealing material (34) in the preferred design. This, in particular for drink cans containing propellant agent like carbonic acid, may be an advantage to enhance the resistance of the seal against inner pressure.

As seen in particular in FIGS. 5 to 8, a ring bead (15) protruding on the upper side (3) of the lid plate (2) is formed around the break-away area (7), the outer flank of which obliquely sloping down and the inner flank (16) of which being vertical, so that the ring-wall (11) is formed in its upper portion by and along the inner flank (16) of the ring bead (15).

Figure 8:
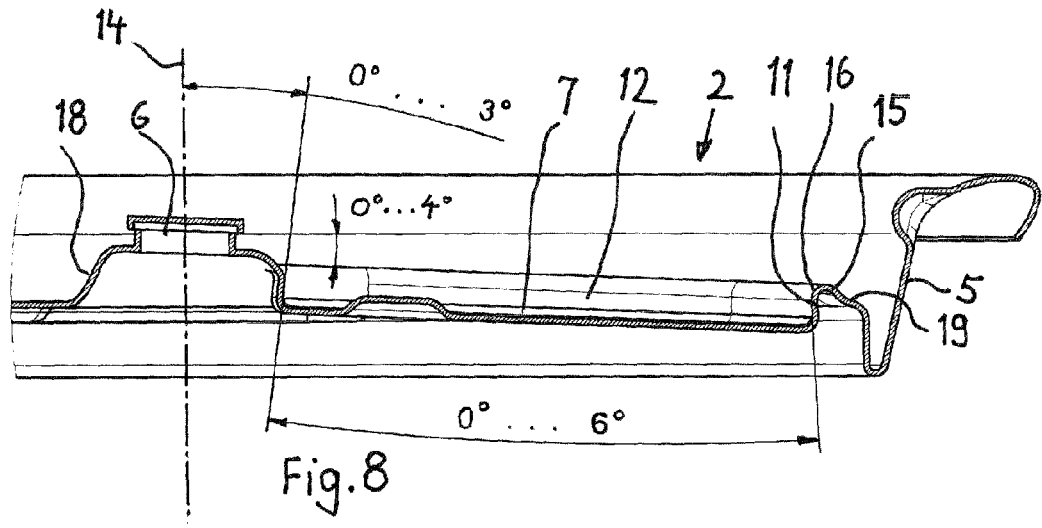
Figure 10:
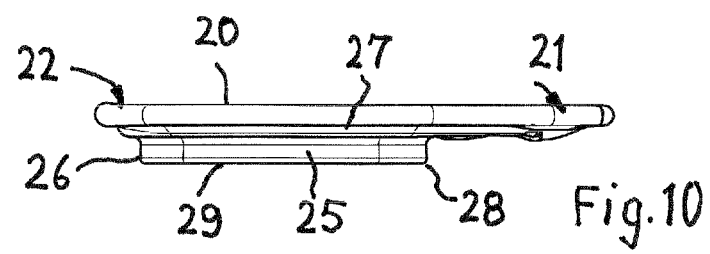
Figure 9:
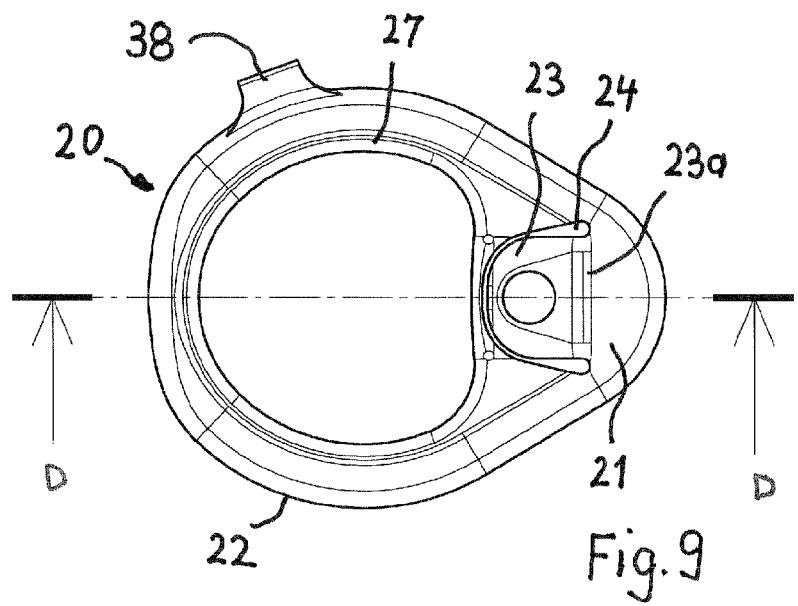
Figure 12:
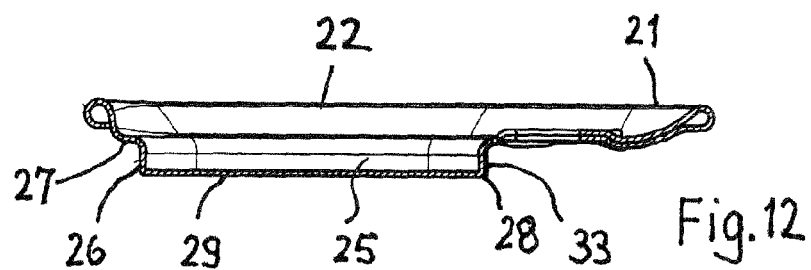
Figure 13:
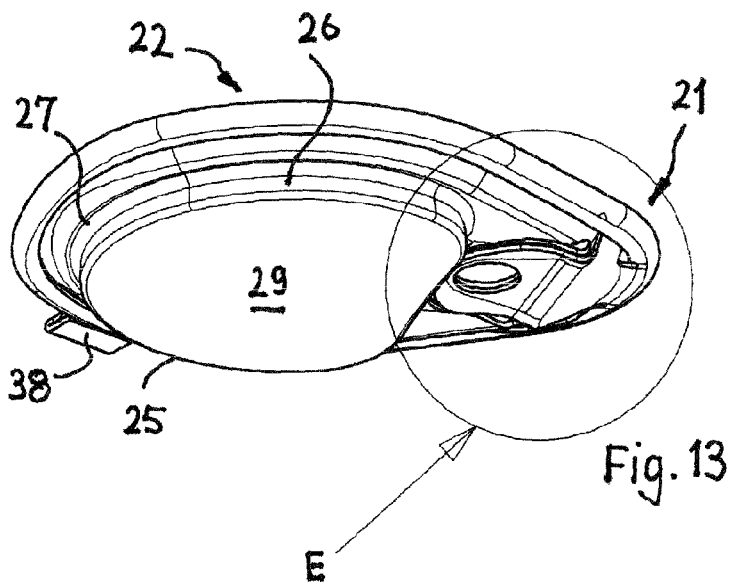

As indicated in FIG. 8, the surface lines of the ring-wall (11) are parallel to the lid axis (14) or in relation to axis (17) tilted at an angle of up to 3°, so that the inner face of the ring-wall (11) widens toward the bottom (13) of the recess (12), surrounded by the ring-wall (11), and thus, seen from its upper edge, is slightly undercut. Due to the congruency of the sealing attachment (25) of the opening tab, the same applies to the surface lines of the sealing rim (26) of the sealing attachment, that, accordingly, is rectangular in its side views, as shown in FIGS. 10, 12 and 13, if the surface lines of the ring-wall (11) are parallel to the lid axis (14).

Further, in the illustrated design, the fixing stud (6) is disposed on a pedestal elevation (18) on the upper side of the lid plate (2) as seen in particular in FIGS. 4, 6 and 8. As shown in FIG. 5, the pedestal elevation (18) is formed on a bulge or bellied portion (47) of the ring bead (15). As entered in FIG. 8, the upper surface of the pedestal elevation (18) may be tilted at an angle of 0° to 4° sloping down toward the break-away area (7). Corresponding to the slope of the upper surface of the elevation (18) is the level at which the opening tab (20) is turned around the fixing stud. As entered in FIG. 5, the width B of the pedestal elevation (18) corresponds, at least in its upper portion, with the width of the fastening tongue.

Furthermore the area of the lid plate (2) surrounding the ring-wall (11) may be sloped at an angle of 0° to 4°, so that, as also shown in FIGS. 4, 6 and 8, the level of the apex of the ring bead (15) is sloped downwards toward the next adjacent portion of the peripheral wall (5) in accordance with the slope of the upper surface of the elevation (18) with reference to the radial level that is vertical to axis (14). In its closing rotating position, the opening tab (20) is at a tilt as well, as seen in FIG. 4.

As shown in FIG. 5 as well, there may be formed an elevated bead portion (41) on the break-away portion (8) near the fixing stud (6), onto which, according to FIG. 2, the force from the press portion (21) of the opening tab (20) will be exercised for breaking in the break-away portion (8) out of its predetermined break-line (9). If there is such a bead portion (41), there will also be a matching bead portion (42) on the upper side of the grip portion (22) (see FIGS. 1 to 4), whereby there will be a recess in the underside of the sealing attachment (25) as a receptacle of the bead portion (41) when the opening tab (20) is in sealing position (see FIG. 4). In order to stiffen the lid plate (2) area on the opposite side of the break-away area (7), there are two arch-like stiffening recesses (40) (see FIGS. 1, 4 and 5) formed into the upper side of the lid plate.

The opening tab (20) should be of a design that is as flexural resistant as possible. In order to achieve this, its overall shape is dish-like as is particularly seen in FIGS. 1, 12 and 13. Into the plate-like grip portion (22), a recess area has been depressed from the upper side, which forms the sealing attachment (25) protruding downwards on the underside of the grip portion, as seen in particular in FIGS. 12 and 13. The sealing attachment (25) is surrounded along its circumference by a circumferential flange (27), that, in the sealing position of the grip portion, protrudes over the ring bead (15), as seen in FIG. 4, and that is, according to FIGS. 12 and 13, flanged or rolled in along the overall circumferential length of the opening tab. On the side of the grip portion (22) there may be a grip tab (38) to lever it out of the sealing position.

In this illustrated design, the fixing stud, as seen in FIGS. 1 to 4 and drawn in FIG. 8, is aligned to the axis (14) of the peripheral wall (15) of the lid plate (2), whilst the grip portion (22) with its free end reaches out close to the inner face of the peripheral wall. Into the portion of the peripheral wall (5), facing away from the fixing stud (6) beyond the break-away portion (8), there is formed a detent (32) from the outside, that, as shown in FIG. 4, cooperates with the outer edge (44) of the circumferential flange (27) of the opening tab (20) in a catching manner in the sealing position of the grip portion (22).

As particularly shown in FIGS. 1 and 2, the opening tab (20) is mounted onto the fixing stud (6) by means of a fastening tongue (23) that sits in a U-shape like cutout (24) between the press portion (21) and the grip portion (22) and which is, on its base (23a), integrally formed onto the side of the press portion (21) facing the grip portion (22). The fastening tongue is bent to and fro around this basis (23a) when swivelling the opening tab (20) up and down. When the grip portion (22) is in its closing rotating position, as shown in FIG. 3, and will then be pressed down with its sealing attachment into the sealing position, as shown in FIG. 4, the swivelling curve of the sealing attachment (25) will be determined by its distance to the tongue basis (23a), that in closing rotating position of the opening tab is on the side of the fixing stud (6) facing away from the sealing attachment (25). On the other hand, the surface lines of the inner face of the ring-wall (11), that surrounds the recess (12) into which the sealing attachment is to be swivelled into, do not run in a curve corresponding to the swivelling curve, but are straight and preferably parallel to lid axis (14) (see FIG. 8). Due to this, the sealing attachment (25), dipping into the recess, will be aligned to the recess along the inner face of the ring-wall (11) in such a way that the sealing attachment can completely enter the recess. The alignment movement of the opening tab (20) will be compensated by a corresponding elastic bending deformation of the fastening tongue (23).

Figure 14:
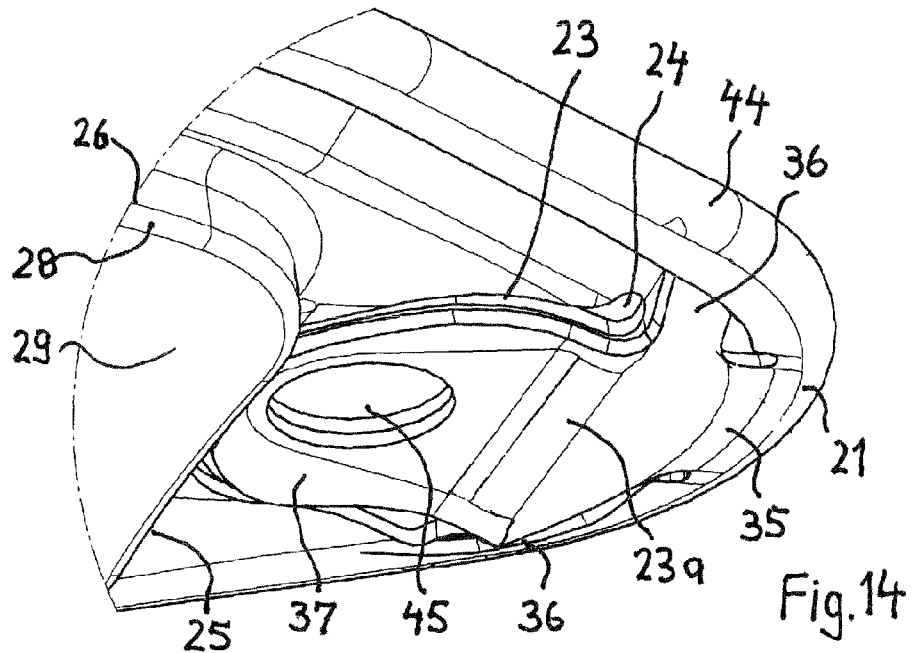

As shown in FIGS. 13 and 14, the press portion and the fastening tongue are of stiffened design in the preferred design. For this purpose, as shown in FIG. 14, a portion (35) of the sheet material blank used to form the opening tab, is folded away from the free end of the press portion (21) back underneath the press portion and the fastening tongue (23). This portion (35) all in all is lamellar and has arms (36) on either side, the free ends of which arms reaching into the flanged edge (44), and furthermore has an end portion (37) that is congruent to the fastening tongue (23) shaped like a tongue. The end portion (37) lies congruently underneath the fastening tongue (23) and is, like the fastening tongue, provided with a fixing hole (45) for rotatably mounting it around the fixing stud. Thus the portion (35) efficiently enhances the bending stiffness of the press portion (21) as well as the bending stiffness of the fastening tongue (23). Thus the elastic bending deformation component of the fastening tongue (23) along the bending basis (23a) is enhanced, resulting from the elasticity of the fastening tongue. As explained further up in the general part of the description, this may be used, as further illustrated in the general part of the description, to elastically press the grip portion (22) into the recess of the break-away area (7) surrounded by the ring-wall (11). Furthermore the doubling-up of the fastening tongue (23) provides for the fastening tongue (23-35) not breaking even when it is bent to and fro several times when opening and closing the can seal several times.

Figure 15:
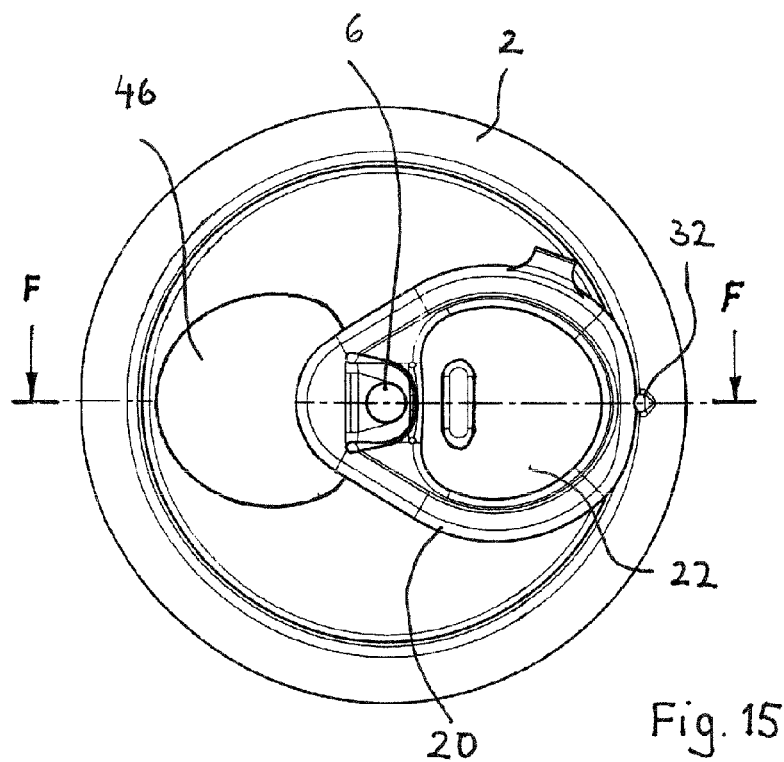
Figure 16:
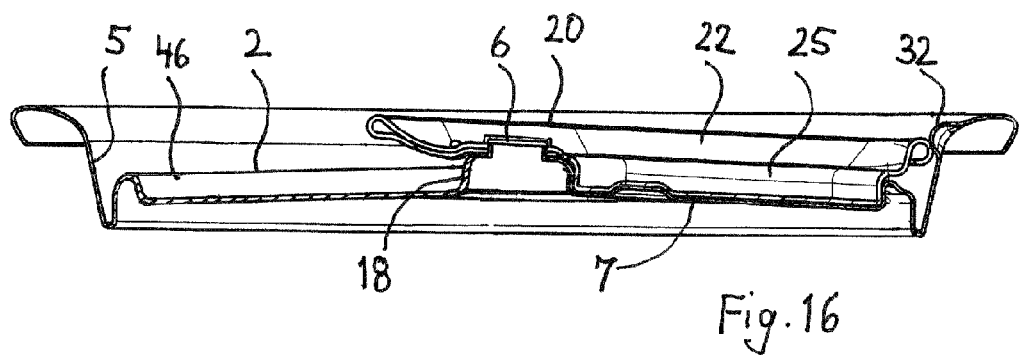

FIGS. 15 and 16 show a modification of the lid design as of FIGS. 3 and 4. Instead of the arch like reinforcing ribs (40) as of FIGS. 3 and 4 there is, according to FIGS. 15 and 16, formed a receiving recess (46) for the sealing attachment (25) of the grip portion (22) of the opening tab (20) into the lid plate 2 on the side of the fixing stud (6) facing away from the break-away area (7). If the opening tab (20), shown in FIGS. 15 and 16 in its closing rotating position, is rotated by 180° around the fixing stud (6) into its opening rotating position, the sealing attachment (25) may be pressed down into the receiving recess (46). Diametrically to the lid plate (2) there may be opposite the detent (32) a second detent (not shown) to lock down the grip portion in opening rotating position of the opening tab as well. As seen in FIG. 16, also the lid area, where the receiving recess (46) is formed, slopes down from the pedestal elevation (18), onto which the fixing stud is mounted, beyond the receiving recess at an angle of up to 4° toward the opposite-portion of the peripheral wall (5).

Otherwise, the design shown in FIGS. 15 and 16 corresponds to the design of FIGS. 3 an 4, so that the description of the design as of FIGS. 3 and 4 may be referred to.

FIGS. 17 and 18 show two designs of a drink can (50) fitted with a re-sealable lid according to this invention. The lid (1) is fitted onto the free can-end (51) of the filled can (50) by means of the peripheral wall of the lid plate (2) and its border is crimped burst-proof onto the free can end (51). The design of lid 1 as of FIG. 17 corresponds with that of FIGS. 1 to 14. Lid 1 as of FIG. 18 is modified such, that the grip-portion (22) of the opening tab has wing-like extensions (39) on either side. As of FIGS. 17 and 18, the opening tab (20) is in its closing rotating position, with the grip portion (22) pressed down into its sealing position, as shown in FIG. 4. Since the sealing attachment (25) of the grip portion of the opening tab (20) fits into the recess (12) surrounded by the ring-wall (11) even if the lid (1) has not yet been opened, the opening tab can be in this sealing position during shipment and storing as well and substantially protects the drinking area of the lid against soiling. This is enhanced by means of the enlargement of the grip portion (22) by means of the wings (39) as of FIG. 18.

FIG. 19 shows and explains a process step of the production of a lid (1) according to the invention. After the production of the lid plate (2) and of the opening tab (20) in separate production steps, and after the opening tab (20) with its fastening tongue has been riveted onto the fixing stud (6), the lid (1) is placed, with the grip portion being in closing rotating position as shown in FIG. 4, into a die (60) of an pressing machine. After this, the press punch (61) is inserted into the recessed upper side of the sealing attachment of the grip portion (22). By pressing the die (60) and the press punch (61) together, the sealing rim of the sealing attachment of the grip portion and the inner face of the ring-wall (11) are jointly repressed to their finish shape. This compensates for production tolerances on the inner face of the ring-wall on the one hand and of the sealing rim of the sealing attachment (25) on the other hand.

The invention claimed is:
1. A can end lid for a can, the can end lid comprising:
a lid plate made of a sheet material and including an upper side and an underside and a peripheral wall that protrudes on and surrounds the upper side of the lid plate, wherein a break-away area that includes a break-away portion is formed in the lid plate between the peripheral wall and a fixing stud disposed on the lid plate, the break-away portion circumferentially defined, at least predominantly, by a predetermined break-line, and
an opening tab made of a sheet material and formed with a press portion and a grip portion and rotatably attached to the fixing stud by means of a fastening tongue that is formed to the press portion within a cutout of the opening tab between the press portion and the grip portion, wherein the grip portion is formed with a downward protruding sealing attachment on the underside of the grip portion, the sealing attachment including a sealing rim around an outer circumferential contour of the sealing attachment, so that the press portion, in the opening rotating position of the opening tab, can be pressed down to separate the break-away portion from the lid plate along the predetermined break-line and create an aperture in the lid plate defined by a defining edge, and that the aperture can be sealed again by the sealing rim of the sealing attachment by pressing down the grip portion into a sealing position after rotating the opening tab around the fixing stud into a closing rotating position, wherein a ring-wall extends around the break-away area of the lid plate and has an inner surface having an inner circumferential contour that is closed in itself between the fixing stud and the peripheral wall of the lid plate and having a height that extends at an angle to the upper side of the lid plate to surround and define a recess that includes a bottom on which the break-away portion and the break-line are formed, wherein the shape of a circumferential contour of the break-line is smaller than the shape of said inner circumferential contour of the inner surface of the ring wall, and wherein the sealing rim of the sealing attachment of the opening tab as to the outer circumferential contour of the sealing attachment is shaped complementary to said inner circumferential contour of the inner surface of the ring-wall that is separate from the defining edge of the aperture, and the sealing rim engages on the inner surface of the ring-wall along said outer circumferential contour of the sealing attachment when the sealing attachment dips into the recess in the sealing position of the grip portion.

2. Can end lid according to claim 1, wherein the peripheral wall of the lid plate is point symmetrical to an axis, and the inner surface of the ring-wall as to the height thereof extends in parallel to said axis at least in an upper portion of the ring-wall.

3. Can end lid according to claim 1, wherein the ring-wall, at least in an upper portion thereof and at least along a predominant part of the inner circumferential contour thereof, is made up by an inner wall of a ring bead protruding on the upper side of the lid plate.

4. Can end lid according to claim 3, wherein the ring bead is continuously formed between the breaking-away area and the fixing stud on a side of the breaking-away area that faces the fixing stud.

5. Can end lid according to claim 3, wherein said inner surface of the ring-wall extends down beyond an inner surface of the inner wall of the ring bead.

6. Can end lid according to claim 1, wherein the fixing stud and the fastening tongue are disposed onto a pedestal elevation, the pedestal elevation protruding on the upper side of the lid plate above the break-away area and above the upper side of the lid plate.

7. Can end lid according to claim 6, wherein an upper surface of the pedestal elevation is sloped downward at an angle toward the breaking-away area.

8. Can end lid according to claim 7, wherein the lid plate includes an area surrounding the ring-wall that is sloped correspondingly to the upper surface of the pedestal elevation.

9. Can end lid according to claim 6, wherein the ring bead is bellied in the area of the fixing stud in a direction facing away from the breaking-away area to form a bellied portion, and wherein the pedestal elevation is formed on the bellied portion of the ring bead.

10. Can end lid according to claim 1, wherein the break-away portion on the bottom of the recess is bordered by a ring-shaped inner angular edge, which, in the sealing position of the grip portion of the opening tab, is overlapped by a ring-shaped outer annular edge of the sealing attachment of the grip portion, wherein the inner angular edge or the outer angular edge is coated with a sealing material.

11. Can end lid according to claim 2, wherein the outer surface and the underside of the sealing attachment are in form and dimension complementary to a lid area formed by the inner surface of the ring-wall and by the upper side of the breaking-away area.

12. Can end lid according to claim 1, wherein the grip portion of the opening tab has a circumferential flange that protrudes over the ring-wall when the opening tab is in the sealing position thereof, and a detent is formed on the side of the breaking-away area facing away from the fixing stud, the detent protruding from an inner side of the peripheral wall of the lid plate and cooperating with the circumferential flange of the grip portion of the opening tab in a latching manner in the sealing position of the grip portion to hold down the sealing attachment in the recess, the detent pressed from an outside of the peripheral wall into the peripheral wall to extend in a circumferential direction of the peripheral wall along one of a limited circumferential length of the circumference of the peripheral wall and the total circumference of the peripheral wall.

13. Can end lid according to claim 6, wherein the press portion and the fastening tongue of the opening tab are reinforced by folding back a blank extension portion of the opening tab under the press portion and the fastening tongue, wherein the extension portion is lamellar and has arms, sticking out on either side thereof and being crimped into the side edges of the grip portion, and has a tongue-shaped end-portion that is identical in shape with the fastening tongue and is fixed, together with the fastening tongue, to the fixing stud in a rotatable manner.

14. Can end lid for a can, the can end lid comprising
a lid plate made of a sheet material and including an upper side and an underside and a peripheral wall that protrudes on and surrounds the upper side of the lid plate, and including a break-away area that is formed between the peripheral wall and a fixing stud, that is disposed on the lid plate, the break-away area including a break-away portion that is circumferentially defined, at least predominantly, by a predetermined break-line, and
an opening tab made of a sheet material and formed with a press portion and a grip portion and being rotatably attached to the fixing stud by means of a fastening tongue that is formed to the press portion within a cutout of the opening tab between the press portion and the grip portion, wherein the grip portion is formed with a downward protruding sealing attachment on the underside of the grip portion, the sealing attachment including a circumferential rim around a circumferential contour of the sealing attachment, so that the press portion, in the opening rotating position of the opening tab, can be pressed down onto the breaking-away portion to separate the break-away portion from the lid plate along the predetermined break-line and create an aperture in the lid plate, and that the aperture can be closed again by the sealing attachment by pressing down the grip portion into a closing position after rotating the opening tab around the fixing stud into a closing rotating position, wherein the breaking-away area is surrounded, at least along a circumferential portion facing away from the fixing stud, by a steep inner wall of a ring bead, the ring bead protruding on the upper side of the lid plate, and wherein the fixing stud and the fastening tongue of the opening tab are disposed above the breaking-away portion on a pedestal elevation protruding on the upper side of the lid plate, wherein the ring bead is bellied in a region of the fixing stud facing away from the breaking-away area to form a bellied portion, and wherein the pedestal elevation is formed on the bellied portion of the ring bead.

15. Can end lid according to claim 14, wherein the upper surface of the pedestal elevation is sloped downwards at an angle toward the breaking-away area.

16. Can end lid according to claim 15, wherein the ring bead is surrounded along the breaking-away area by an area that is sloped correspondingly to the upper surface of the pedestal elevation.

17. Can end lid according to claim 14, wherein the ring bead, on the side of the breaking-away area facing the fixing stud, is continuously formed between the breaking-away area and the fixing stud.

18. Can end lid according to claim 14, wherein the grip portion of the opening tab includes a circumferential flange, that, in the sealing position of the grip portion, protrudes beyond the ring bead, and an inner side of the peripheral wall is formed with a detent that protrudes from the inner side of the peripheral wall of the lid plate on the side of the ring bead facing away from the fixing stud, the detent cooperating with the circumferential flange in a latching manner to hold down the grip portion of the opening tab in the sealing position, the detent pressed from an outside of the peripheral wall into the peripheral wall to extend in a circumferential direction of the peripheral wall along one of a limited circumferential length of a circumference of the peripheral wall and along the total circumference of the peripheral wall.

19. Can end lid for a can, the can end lid comprising:
a lid plate made of a sheet material and including an upper side and an underside and a peripheral wall that protrudes on and surrounds the upper side of the lid plate, and including a break-away portion between the peripheral wall and a fixing stud, that is disposed on the lid plate, the break-away portion circumferentially defined, at least predominantly, by a predetermined break-line, and
an opening tab made of a sheet material and including a press portion and a grip portion and being rotatably attached to the fixing stud by means of a fastening tongue that is formed to the press portion within a cutout of the opening tab between the press portion and the grip portion, wherein a downward protruding sealing attachment is formed on the underside of the grip portion, the sealing attachment including a sealing rim around a circumferential contour of the sealing attachment,
so that the press portion, in the opening rotating position of the opening tab, can be pressed down onto the break-away portion to separate the break-away portion from the lid plate along the predetermined break-line and create an aperture in the lid plate, and that the aperture may be closed again by the sealing rim of the sealing attachment by pressing down the grip portion into a sealing position after rotating the opening tab around the fixing stud into a closing rotating position,
wherein the grip portion of the opening tab includes a circumferential flange that in the sealing position of the grip portion protrudes beyond the breaking-away area, and a detent is formed on the peripheral wall on the side of the breaking-away area facing away from the fixing stud to project from an inner side of the peripheral wall, wherein the detent is pressed from an outside of the peripheral wall into the peripheral wall to extend in a circumferential direction of the peripheral wall along one of a limited circumferential length of the circumference of the peripheral wall and the total circumference of the peripheral wall, the detent cooperating with the circumferential flange in a latching manner to hold down the grip portion in the sealing position of the grip portion of the opening tab.

20. Drink can comprising a can end lid, the can end lid comprising:
a lid plate made of a sheet material and including an upper side and an underside and a peripheral wall that protrudes on and surrounds the upper side of the lid plate, wherein a break-away area that includes a break-away portion is formed in the lid plate between the peripheral wall and a fixing stud disposed on the lid plate, the break-away portion circumferentially defined, at least predominantly, by a predetermined break-line, and
an opening tab made of a sheet material and formed with a press portion and a grip portion and rotatably attached to the fixing stud by means of a fastening tongue that is formed to the press portion within a cutout of the opening tab between the press portion and the grip portion, wherein the grip portion is formed with a downward protruding sealing attachment on the underside of the grip portion, the sealing attachment including a sealing rim around an outer circumferential contour of the sealing attachment,
so that the press portion, in the opening rotating position of the opening tab, can be pressed down to separate the break-away portion from the lid plate along the predetermined break-line and create an aperture in the lid plate that is defined by a defining edge, and that the aperture can be sealed again by the sealing rim of the sealing attachment by pressing down the grip portion into a sealing position after rotating the opening tab around the fixing stud into a closing rotating position,
wherein a ring-wall extends around the break-away area of the lid plate and has an inner surface having an inner circumferential contour that is closed in itself between the fixing stud and the peripheral wall of the lid plate and having a height that extends at an angle to the upper side of the lid plate and surrounds and defines a recess that includes a bottom on which the break-away portion and the break-line are formed, wherein the shape of a circumferential contour of the break-line is smaller than the shape of the inner circumferential contour of the ring wall,
wherein the sealing rim of the sealing attachment of the opening tab as to the outer circumferential contour of the sealing attachment is shaped complementary to said inner circumferential contour of the inner surface of the ring-wall that is separate from the defining edge of the aperture, and the sealing rim engages on the inner surface of the ring-wall along said outer circumferential contour of the sealing attachment when the sealing attachment dips into the recess in the sealing position of the grip portion,
wherein the ring-wall, at least in an upper portion of the inner surface thereof and at least along a predominant part of the inner circumferential contour of the inner surface thereof, is made up by a steep inner wall of a ring bead protruding on the upper side of the lid plate, the ring bead is continuously formed between the breaking-away area and the fixing stud on a side of the breaking-away area that faces the fixing stud, and said inner surface of the ring-wall extends down beyond an inner surface of the inner wall of the ring bead, and
wherein the fixing stud and the fastening tongue are disposed onto a pedestal elevation, the pedestal elevation protruding on the upper side of the lid plate above the break-away area and above the upper side of the lid plate, wherein the ring bead is bellied in the area of the fixing stud in a direction facing away from the breaking-away area to form a bellied portion and the pedestal elevation is formed on the bellied portion of the ring bead.

21. Drink can according to claim 20, wherein the grip portion of the opening tab includes a circumferential flange that protrudes beyond the ring-wall in the closing rotating position of the opening tab, and wherein the opening tab is in the closing rotating position and is dipping with the sealing attachment into the recess surrounded by the ring-wall while the break-away portion is closed and un-separated, and the opening tab in the closing rotation position thereof has a portion of the circumferential flange that faces away from the fixing stud and is in a location close to the peripheral wall of the lid plate, so that the breaking-away area and the ring-wall are covered by the grip portion and the circumferential flange thereof.

22. Manufacturing process for a can end lid, the can end lid comprising a lid plate made of a sheet material and including an upper side and an underside and a peripheral wall that protrudes on and surrounds the upper side of the lid plate, and in which, between the peripheral wall and a fixing stud disposed on the lid plate, a break-away area with a break-away portion is formed, the break-away portion circumferentially defined, at least predominantly, by a predetermined break-line, and an opening tab made of a sheet material and formed with a press portion and a grip portion and rotatably attached to the fixing stud by means of a fastening tongue that is formed to the press portion within a cutout of the opening tab between the press portion and the grip portion, wherein the grip portion is formed with a downward protruding sealing attachment on the underside of the grip portion, the sealing attachment including a sealing rim around an outer circumferential contour of the sealing attachment, so that the press portion, in the opening rotating position of the opening tab, can be pressed down to separate the break-away portion from the lid plate along the predetermined break-line and create an aperture in the lid plate, and that the aperture can be sealed again by the sealing rim of the sealing attachment by pressing down the grip portion into a sealing position after rotating the opening tab around the fixing stud into a closing rotating position, wherein a ring-wall extends around the break-away area of the lid plate that has an inner circumferential contour that is closed in itself between the fixing stud and the peripheral wall of the lid plate and that surrounds and defines a recess that includes a bottom on which the break-away portion and the break-line are formed, and wherein the sealing rim of the sealing attachment of the opening tab as to the outer circumferential contour of the sealing rim is shaped complementary to said inner circumferential contour of the ring-wall and the sealing rim engages on the inner surface of the ring-wall along said outer circumferential contour of the sealing rim when the sealing attachment dips into the recess in the sealing position of the grip portion, wherein the manufacturing process is characterized in, that:
the lid plate and the opening tab are form-shaped in separate process steps to form the ring wall of the lid plate and the sealing rim forming circumferential wall of the sealing attachment, respectively,
and the opening tab is then rotatably riveted with its fastening tongue to the fixing stud of the lid plate,
after which the ring wall of the lid plate together with the sealing rim forming circumferential wall of the sealing attachment of the opening tab are commonly repressed between a press die and a press ram in such a state of the lid plate and of the opening tab in which the opening tab is in the closing rotating position and the grip portion is lowered into the sealing position thereof, in which the sealing attachment of the grip portion with its sealing rim engages on the inner surface of the ring-wall.

23. Manufacturing process according to claim 22, wherein after the repressing operation, the peripheral wall of the lid plate is fitted form-fit with a free flange of the peripheral wall onto a can end of the can in such a state of the opening tab in which the grip portion is disposed in its sealing position.

24. Can end lid according to claim 2, wherein the ring-wall, at least in an upper portion thereof and at least along a predominant part of the inner circumferential contour thereof, is made up by an inner wall of a ring bead protruding on the upper side of the lid plate.

25. Can end lid according to claim 24, wherein said inner surface of the ring-wall extends down beyond an inner surface of the inner wall of the ring bead.

26. Can end lid according to claim 25, wherein the ring bead is continuously formed between the breaking-away area and the fixing stud on a side of the breaking-away area that faces the fixing stud.

27. Can end lid according to claim 2, wherein the fixing stud and the fastening tongue are disposed onto a pedestal elevation, the pedestal elevation protruding on the upper side of the lid plate above the break-away area and above the upper side of the lid plate.

28. Can end lid according to claim 24, wherein the fixing stud and the fastening tongue are disposed onto a pedestal elevation, the pedestal elevation protruding on the upper side of the lid plate above the break-away area and above the upper side of the lid plate.

29. Can end lid according to claim 26, wherein the fixing stud and the fastening tongue are disposed onto a pedestal elevation, the pedestal elevation protruding on the upper side of the lid plate above the break-away area and above the upper side of the lid plate.

30. Can end lid according to claim 28, wherein the ring bead is bellied in the area of the fixing stud in a direction facing away from the breaking-away area to form a bellied portion, and wherein the pedestal elevation is formed on the bellied portion of the ring bead.

31. Can end lid according to claim 29, wherein the ring bead is bellied in the area of the fixing stud in a direction facing away from the breaking-away area to form a bellied portion, and wherein the pedestal elevation is formed on the bellied portion of the ring bead.

32. Can end lid according to claim 30, wherein the break-away portion on the bottom of the recess is bordered by a ring-shaped inner angular edge, which, in the sealing position of the grip portion of the opening tab, is overlapped by a ring-shaped outer annular edge of the sealing attachment of the grip portion, wherein the inner angular edge or the outer angular edge is coated with a sealing material.

33. Can end lid according to claim 31, wherein the grip portion of the opening tab has a circumferential flange that protrudes over the ring wall when the opening tab is in the sealing position thereof, and a detent is formed on the side of the breaking-away area facing away from the fixing stud, the detent protruding from an inner side of the peripheral wall of the lid plate and cooperating with the circumferential flange of the grip portion of the opening tab in a latching manner in the sealing position of the grip portion to hold down the sealing attachment in the recess, the detent pressed from an outside of the peripheral wall into the peripheral wall to extend in a circumferential direction of the peripheral wall along one of a limited circumferential length of the circumference of the peripheral wall and the total circumference of the peripheral wall.

34. Can end lid according to claim 33, wherein the breakaway portion on the bottom of the recess is bordered by a ring-shaped inner angular edge, which, in the sealing position of the grip portion of the opening tab, is overlapped by a ring-shaped outer annular edge of the sealing attachment of the grip portion.

35. Can end lid according to claim 18, wherein the breakaway portion is bordered by a ring-shaped inner angular edge, which, in the closing position of the grip portion of the opening tab, is overlapped by a ring-shaped outer annular edge of the sealing attachment of the grip portion.

36. Can end lid according to claim 29, wherein the grip portion in the closing rotating position of the opening tab extends close to the peripheral wall of the lid plate and is extended on either side thereof in an area adjacent to the peripheral wall.

37. Can end lid according to claim 34, wherein at least one arch shaped stiffening recess is formed into the lid plate on the side of the fixing stud facing away from the breaking-away area.

38. Drink can according to claim 20, wherein the grip portion of the opening tab has a circumferential flange that protrudes over the ring-wall when the opening tab is in the sealing position thereof, and a detent is formed on the side of the breaking-away area facing away from the fixing stud, the detent protruding from an inner side of the peripheral wall of the lid plate and cooperating with the circumferential flange of the grip portion of the opening tab in a latching manner in the sealing position of the grip portion to hold down the sealing attachment in the recess, the detent pressed from an outside of the peripheral wall into the peripheral wall to extend in a circumferential direction of the peripheral wall along one of a limited circumferential length of the circumference of the peripheral wall and the total circumference of the peripheral wall.

39. Drink can according to claim 38, wherein the breakaway portion on the bottom of the recess is bordered by a ring-shaped inner angular edge, which, in the sealing position of the grip portion of the opening tab, is overlapped by a ring-shaped outer annular edge of the sealing attachment of the grip portion.

40. Drink can according to claim 39, wherein the peripheral wall of the lid plate is point symmetrical to an axis, and the inner surface of the ring-wall as to the height thereof extends in parallel to said axis at least in an upper portion of the ring-wall.

\* \* \* \* \*